(12) United States Patent
Ye

(10) Patent No.: US 8,515,037 B2
(45) Date of Patent: Aug. 20, 2013

(54) METHOD AND SYSTEM FOR PROVIDING MANAGED CALLER IDENTIFICATION SERVICES

(75) Inventor: Baoqing Ye, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1231 days.

(21) Appl. No.: 12/138,178

(22) Filed: Jun. 12, 2008

(65) Prior Publication Data

US 2009/0310766 A1 Dec. 17, 2009

(51) Int. Cl.
*H04M 1/56* (2006.01)
*H04M 15/06* (2006.01)
*H04M 3/42* (2006.01)

(52) U.S. Cl.
USPC .............. 379/142.06; 379/207.15; 455/415

(58) Field of Classification Search
USPC ............ 379/142.01, 142.04, 142.06, 142.15, 379/142.16, 207.15; 455/415
See application file for complete search history.

(56) References Cited

U.S. PATENT DOCUMENTS

| | | | | |
|---|---|---|---|---|
| 5,414,457 A | * | 5/1995 | Kadowaki et al. | 348/14.03 |
| 6,888,927 B1 | * | 5/2005 | Cruickshank et al. | 379/88.11 |
| 7,660,404 B2 | * | 2/2010 | Min et al. | 379/142.01 |
| 2003/0012353 A1 | * | 1/2003 | Tang et al. | 379/142.17 |
| 2004/0209604 A1 | * | 10/2004 | Urban et al. | 455/415 |
| 2005/0031106 A1 | * | 2/2005 | Henderson | 379/142.17 |

* cited by examiner

*Primary Examiner* — Quoc D Tran

(57) ABSTRACT

An approach provides managed caller identification services. An image is retrieved from a repository maintained by a service provider in response to initiation of a communication session by the user with another user. The image is associated with a directory address for a user. The image is transmitted along with the directory address for presentation to the other user during establishment of the communication session.

23 Claims, 11 Drawing Sheets

| USER NAME | DIRECTORY ADDRESS | SCHEDULE | CID IMAGE OR IMAGE LOCATOR | IMAGE PREVIEW | CID TEXT | RINGTONE | RINGBACK |
|---|---|---|---|---|---|---|---|
| JOHN SMITH | (555) 444 – 3333 | MON – FRI 9:00 AM – 5:00 PM | MY_IMAGE.JPEG | | N/A | N/A | N/A |
| | | MON – FRI 5:01 PM – 8:59 AM | WWW.ADDRESS_1.COM | | MESSAGE "2" | RINGTONE "2" | RINGBACK "2" |
| | | SAT & SUN ALL DAY | WWW.ADDRESS_2.COM | | MESSAGE "3" | RINGTONE "3" | RINGBACK "3" |
| | | . . . | . . . | . . . | . . . | . . . | . . . |
| | | 01/01 | IMAGE_N.GIF | | HAPPY BIRTHDAY JANE | RINGTONE "N" | RINGBACK "N" |
| | | . . . | . . . | . . . | . . . | . . . | . . . |
| JOHN SMITH | (999) 888 – 7777 | ALWAYS | VZ_LOGO.JPEG | verizon | N/A | N/A | N/A |

| USER NAME | DIRECTORY ADDRESS | SCHEDULE | CID IMAGE OR IMAGE LOCATOR | IMAGE PREVIEW | CID TEXT | RINGTONE | RINGBACK |
|---|---|---|---|---|---|---|---|
| JOHN SMITH | (555) 444 – 3333 | MON – FRI 9:00 AM – 5:00 PM | MY_IMAGE.JPEG | | N/A | N/A | N/A |
| | | MON – FRI 5:01 PM – 8:59 AM | WWW.ADDRESS_1.COM | | MESSAGE "2" | RINGTONE "2" | RINGBACK "2" |
| | | SAT & SUN ALL DAY | WWW.ADDRESS_2.COM | | MESSAGE "3" | RINGTONE "3" | RINGBACK "3" |
| | | ... | | | ... | ... | ... |
| | | 01/01 | IMAGE_N.GIF | | HAPPY BIRTHDAY JANE | RINGTONE "N" | RINGBACK "N" |
| | | ... | | | ... | ... | ... |
| JOHN SMITH | (999) 888 – 7777 | ALWAYS | VZ_LOGO.JPEG | | N/A | N/A | N/A |

FIG. 6B

| BUDDY NAME | DIRECTORY ADDRESS | SCHEDULE | CID IMAGE OR IMAGE LOCATOR | IMAGE PREVIEW | CID TEXT | RINGTONE | RINGBACK |
|---|---|---|---|---|---|---|---|
| | | | | | | RINGTONE | RINGBACK |
| JANE DOE | (123) 456 – 7890 | MON – FRI 9:00 AM – 5:00 PM | IMAGE_1.TIFF |  | MESSAGE "1" | RINGTONE "1" | RINGBACK "1" |
| | | MON – FRI 5:01 PM – 8:59 AM SAT & SUN | WWW.ADDRESS_1.COM |  | MESSAGE "2" | RINGTONE "2" | RINGBACK "2" |
| | | . . . | | | . . . | . . . | . . . |
| | | 01/01 | IMAGE_M.PNG |  | WISH JANE A HAPPY BIRTHDAY | BIRTHDAY RINGTONE | BIRTHDAY RINGBACK |
| JOHN DOE | (987) 654 – 3210 | MON – SUN | WWW.ADDRESS_2.COM | | MESSAGE "3" | RINGTONE "2" | RINGBACK "2" |
| . . . | . . . | . . . | | | . . . | . . . | . . . |
| NAME "N" | DIRECTORY ADDRESS "N" | SCHEDULE "N" | IMAGE_N.SVG | | MESSAGE "N" | RINGTONE "N" | RINGBACK "N" |

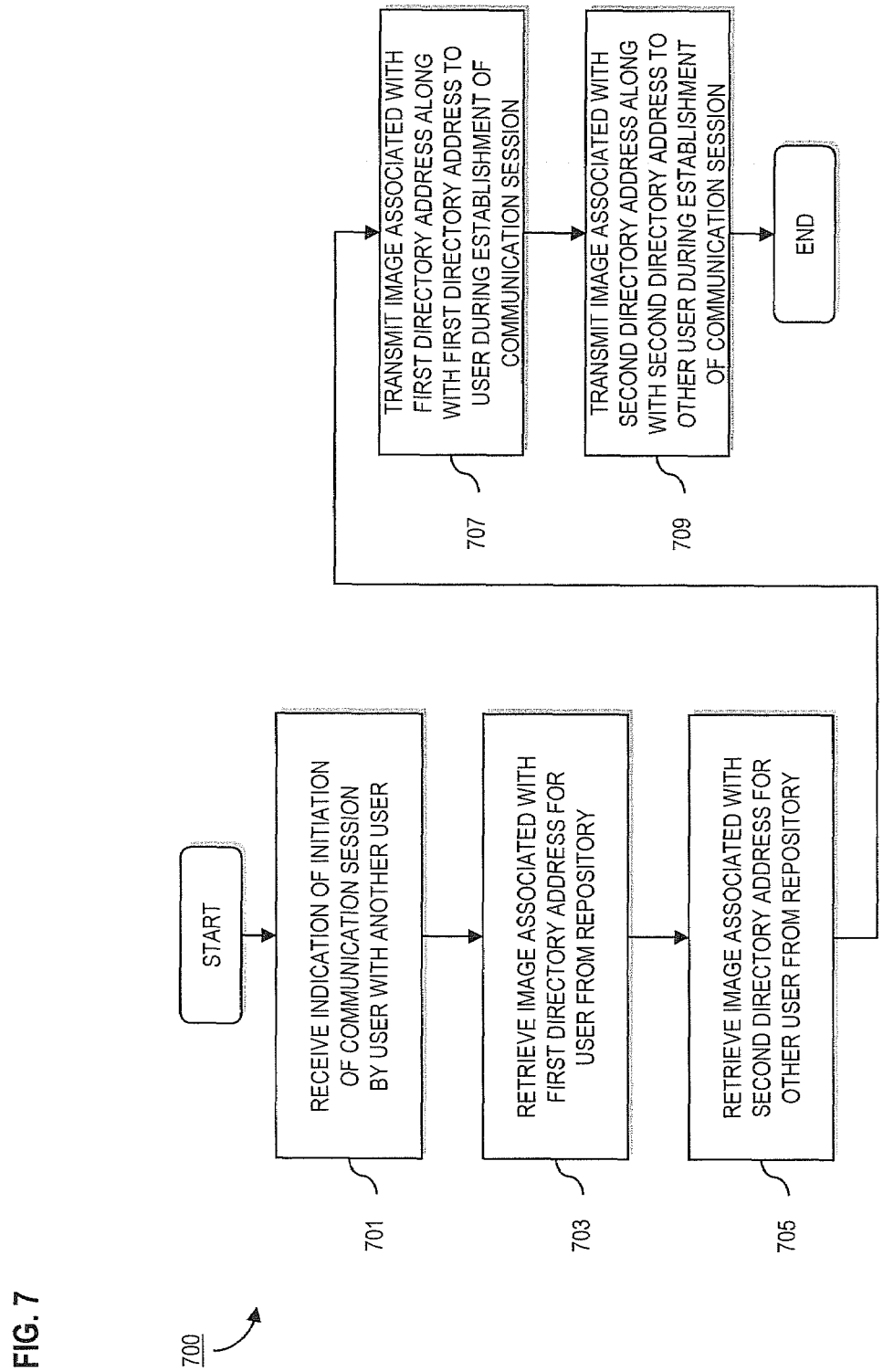

METHOD AND SYSTEM FOR PROVIDING MANAGED CALLER IDENTIFICATION SERVICES

BACKGROUND INFORMATION

The telecommunication industry offers a wide variety of telephony services to customers via wired and wireless networks. However, with the advent of packet switched networks supporting, for example, voice over Internet Protocol services, an increasing number of individuals have been migrating from the use of traditional communication based technologies to synergistic multimedia platforms, as well as to converged infrastructures, e.g., legacy circuit-switched networks converged with packet-switched networks, wired networks converged with wireless networks, etc.. As such, traditional telecommunication service providers are being challenged to develop new sources of revenue, such as enhanced caller identification services. When a caller places a call to a called party, either the telephony network or an end device identifies the caller to the called party through caller identification information, i.e., name and directory address of the caller. Traditionally, this caller identification information conveyed no other information.

Therefore, there is a need for an approach that provides enhanced caller identification information, as well as provides caller identification more efficiently and effectively.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A and 6B are respective diagrams of a caller identification profile and a caller identification buddy list, according to exemplary embodiments;

FIG. 7 is a flowchart of a process for delivery of managed caller identifications, according to an exemplary embodiment;

DESCRIPTION OF THE PREFERRED EMBODIMENT

A preferred apparatus, method, and software for providing managed caller identification services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to image-based caller identification (CID) displays, it is contemplated that various exemplary embodiments are also applicable to auditory CID presentations, media CID presentations, multimedia CID presentations, and the like.

Figure 1:
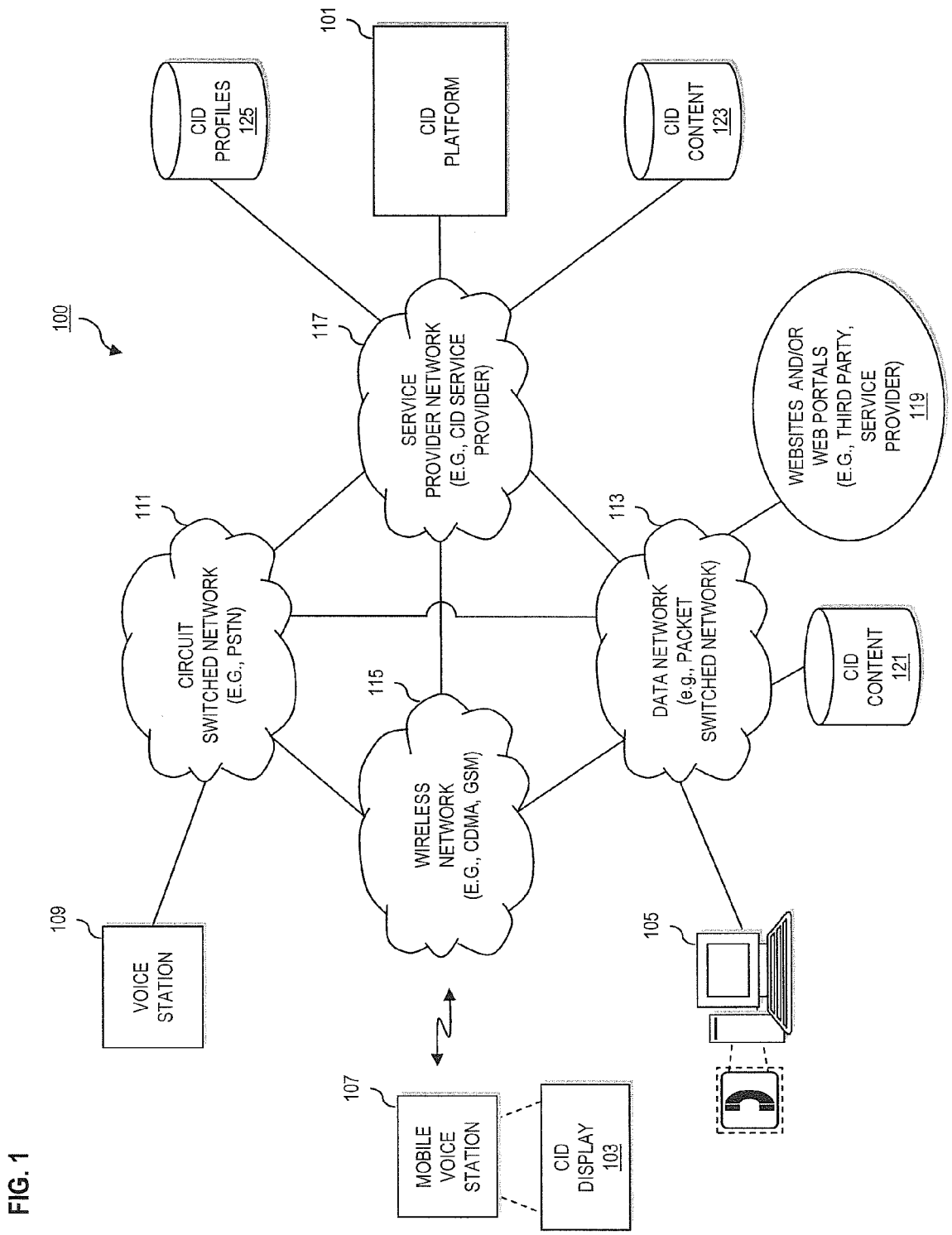
FIG. 1 is a diagram of a system capable of providing managed caller identification services, according to an exemplary embodiment.

FIG. 1 is a diagram of a system capable of providing managed caller identification services, according to an exemplary embodiment. For the purposes of explanation, a system 100 including a caller identification (CID) platform 101 configured to provide CID displays (e.g., CID display 103), to one or more client devices (e.g., computing device 105, mobile voice station 107, and/or voice station 109) over one or more networks (e.g., telephony network 111, data network 113, and/or wireless network 115), are described with respect to service provider network 117, such as a network of a CID service provider. By way of example, the data network 113 can be a packet-switched network, and the telephony network 111 is a circuit-switched network. While specific reference will be made thereto, it is contemplated that system 100 may embody many forms and include multiple and/or alternative components and facilities.

As mentioned, when a calling party traditionally initiated a communication session (e.g., telephone call) with a called party over an existing communication network, either the communication network (e.g., a call processing entity) or an end device (e.g., telephony terminal) provided the called party with CID information, e.g., name and/or directory address corresponding to the calling party. Based on the CID information, the called party was then able to choose whether or not to accept (e.g., answer) the communication session. In response to the overwhelming success of CID, telecommunication service providers have begun extending the methodology to other CID-like identifiers, such as distinctive ringtones and image-based contact managers, which provide called parties with additional mechanisms to identify calling parties. Device manufacturers are also enabling called parties to locally specify CID information and/or CID-like identifiers for identifying calling parties. Unfortunately, these technologies are limited to "incoming" communication sessions. Namely, when a calling party initiates an "outgoing" communication session, the calling party is not provided with any information to aid them in confirming that they are, in fact, attempting to communicate with an intended called party. These technologies have also been limited to "local" implementations. That is, there is no centralized approach for specifying, storing, and managing CID profiles. Further, these technologies are confined to called-party specification. More specifically, the calling party is presently incapable of controlling what CID information or CID-like identifiers are presented to a calling party. All in all, existing CID services and technologies do not enable called parties and calling parties, alike, to robustly or ubiquitously individualize their CID experiences. Thus, it is apparent that more flexible, efficient techniques for CID are needed.

Therefore, the approach according to certain embodiments stems from the recognition that providing a managed CID service, whereby subscribers can create and configure one or more CID profiles including associations between images, directory addresses, and other CID-like identifiers, provides an efficient and convenient technique to enable individuals to enhance and personalize their CID experiences, as well as provides service providers a synergistic approach for leveraging existing infrastructures and for generating new sources of revenue.

As seen in FIG. 1, system 100 introduces a managed CID service through a CID platform 101 that is configured to enable users to upload or specify the location of one or more images and associate those images with one or more directory addresses and/or other CID-like identifiers, e.g., messages, ringtones, ringbacks, etc. In certain instances, users may upload images from any suitable client device (or end terminal), such as computing device 105, mobile voice station 107, or voice station 109. Additionally or alternatively, the location of one or more images may be specified by users according to an, extensible resource identifier (XRI), internet protocol (IP) address, uniform resource identifier (URI), hypertext transfer protocol (HTTP) address, or other suitable address, identifier, or locator. As such, exemplary embodiments enable users to specify the location of images posted to a website(s) or web portal(s) 119, e.g., a social network site, or maintained at a networked storage facility, such as repository 121, which is configured to store CID content, such as one or more images or image locations. Accordingly, CID platform 101 (or another component or facility of system 100) may include a domain name system (DNS) for associating various addresses, identifiers, or locators with domain names for obtaining specified images. Further, CID platform 101 may also be configured to maintain one or more centralized repositories (e.g., CID content repository 123 and CID profiles repository 125) to enable users to create and configure (e.g., schedule, etc.) one or more CID profiles including, in exemplary embodiments, one or more CID buddy lists for organizing and managing CID information and CID-like identifiers. Scheduling may be based on one or more dates, times, or events. In this manner, CID platform 101 may also be configured to provide, or be accessible via, a networked (e.g., online, web, etc.) portal and, as such, may be implemented as, or distributed between, one or more frontend, middleware, and/or backend servers. CID platform 101 is described in more detail in association with FIG. 2.

In exemplary embodiments, system 100 enables managed CID services through one or more CID presentations, e.g., CID display 103. For instance, in response to a user initiating a communication session with another user, an image associated with a directory address for the user may be retrieved from a repository maintained by a service provider, such as CID content repository 123. The image along with the directory address may then be transmitted to the other user during establishment of the communication session. Further, the repository 123 (or another repository, e.g., CID content repository 121) may include an image for the other user for presentation to the user during establishment of the communication session. Accordingly, the image for the other user, along with a corresponding directory address and/or CID-like identifiers, may be transmitted to the user before, during, or after the CID transmission to the other user. Additionally or alternatively, CID information and/or CID-like identifiers for the user or the other user may be stored or partially cached to a memory or local (or external) repository of client devices 105-109 and, therefore, need not be provided by CID platform 101. In particular instances, presentation of CID information and/or CID-like identifiers may include modifying resolution of the images or modifying compression of the images. Namely, CID platform 101 may store and/or provide images in a compressed format or lower resolution for storage and bandwidth efficiencies, wherein end terminals 105-109, or other network node (e.g., a call processing entity), may be configured to uncompress or increase resolution of the image for enhanced presentation. In other instances, CID display 103 may be configured as a media or multimedia presentation that includes sound content (e.g., a distinctive ringtone, recorded utterance, etc.), text content (e.g., short message, reminder, etc.), and/or video content (e.g., a short video clip, media content, etc.). This media or multimedia content may be stored at any suitable location, e.g., CID content repositories 121, 123, CID profiles repository 125, or in any suitable memory, e.g., a memory of communication devices 105-109, CID platform 101, etc.

According to various embodiments, the communication session may correspond to a voice call established over one or more wireline and/or wireless circuit-switched networks and/or packet-switched networks. These networks may correspond to circuit-switched network 111, packet-switched network 113, wireless network 115, and/or service provider network 117. For example, circuit-switched network 111 may include a circuit-switched telephony network, such as the public switched telephone network (PSTN), an integrated services digital network (ISDN), a private branch exchange (PBX), or other network configured to provide voice services over wired access networks. Wireless network 115 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, packet-switched network 113 may be any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary soft-switched VoIP network, or a proprietary cable or fiber-optic network.

Although depicted as separate entities, networks 111-117 may be completely or partially contained within one another, or may embody one or more of the aforementioned infrastructures. For instance, service provider network 117 may embody circuit-switched and/or packet-switched telephony networks that include facilities to provide for transport of circuit-switched and/or packet-based telephony communications. It is further contemplated that networks 111-117 may include components and facilities to provide for signaling and/or bearer communications between the various components or facilities of system 100. In this manner, networks 111-117 may embody or include portions of a signaling system 7(SS7) network, or other suitable infrastructure to support control and signaling functions.

Accordingly, the conjunction of networks 111-117 may be adapted to provide the managed CID service of system 100, enable user access to CID platform 101, and facilitate communication sessions between calling parties and called parties at various end terminals, such as communication devices 105-109. As such, communication devices 105-109 may include any customer premise equipment (CPE) capable of sending and/or receiving voice communications over one or more of networks 111-117, as well as include (or be accompanied by) a suitable monochromatic or color display for CID presentation. For instance, voice station 109 may be any suitable plain old telephone service (POTS) device, facsimile machine, etc., while mobile voice station 107 may be any cellular phone, radiophone, femtocell phone, satellite phone, smart phone, wireless phone (e.g., WiFi/802.11 phone), or any other suitable mobile voice-enabled device, such as a personal digital assistant (PDA), pocket personal computer, tablet, customized hardware, etc. Further, computing device 105 may be any voice-enabled computing device capable of packetized voice communications, such as a VoIP phone, skinny client control protocol (SCCP) phone, session initiation protocol (SIP) phone, IP phone, personal computer, softphone, etc. In other instances, computing device 105 need not be voice-enabled and, therefore, primarily utilized to access CID platform 101 for creating and configuring (e.g., scheduling, etc.) one or more CID profiles, or to access CID content repositories 121 and 123, CID profiles repository 125, or websites and/or web portals 119.

As shown, system 100 includes CID content repositories 121 and 123, as well as CID profiles repository 125. CID content repositories 121, 123 may include various CID information, CID-like identifiers, and/or suitable media or multimedia content. In exemplary embodiments, CID repositories, at least, include image content like, for example, avatars, drawings, figures, graphics, logos, pictures, photographs, etc. Media or multimedia content may correspond to aural content (e.g., music, ringbacks, ringtones, sound, utterances, etc.) and/or other visual content (e.g., text, video, etc.) suitable for use in one or more CID presentations, e.g., CID display 103. While it is contemplated that CID content particularly includes "actual" content (e.g., actual images), embodiments of system 100 are not so limited. For instance, CID repositories 121, 123 may include links, indicators, or locators, e.g., IP addresses, HTTP addresses, URIs, XRIs, etc., for acquiring the actual content from other repositories, storage locations, websites 119, etc. In certain embodiments, the CID content of CID repositories 121, 123 may include CID content provided or maintained by third-party suppliers (e.g., networked social sites) or a service provider. These additional forms of CID content may be modified by subscribers and/or made to append to CID presentations, such as CID display 103.

CID profiles repository 125 may include information corresponding to subscribers of the managed CID service, such as standard user profile information, e.g., subscription information (account numbers, directory addresses, usernames, passwords, security questions, monikers, circuit identification (ID), private virtual connection (PVC) ID, virtual local area network (VLAN) ID, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other suitable information. According to various embodiments, CID profiles may include one or more association tables, such as described with respect to FIG. 6A, or one or more CID buddy lists, which are more fully explained in connection with FIG. 6B.

Accordingly, it is contemplated that the physical implementation of repositories 121-125 may take many forms, including, for example, portions of existing repositories of a service provider, new repositories of a service provider, third-party repositories, and/or shared-repositories. As such, repositories 121-125 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 121-125 are provided in distributed fashions, information and content available via repositories 121-125 may be located utilizing various querying mechanisms, such as electronic number matching (ENUM), distributed universal number discovery (DUNDi), uniform resource identifiers (URI), etc.

Figure 2:
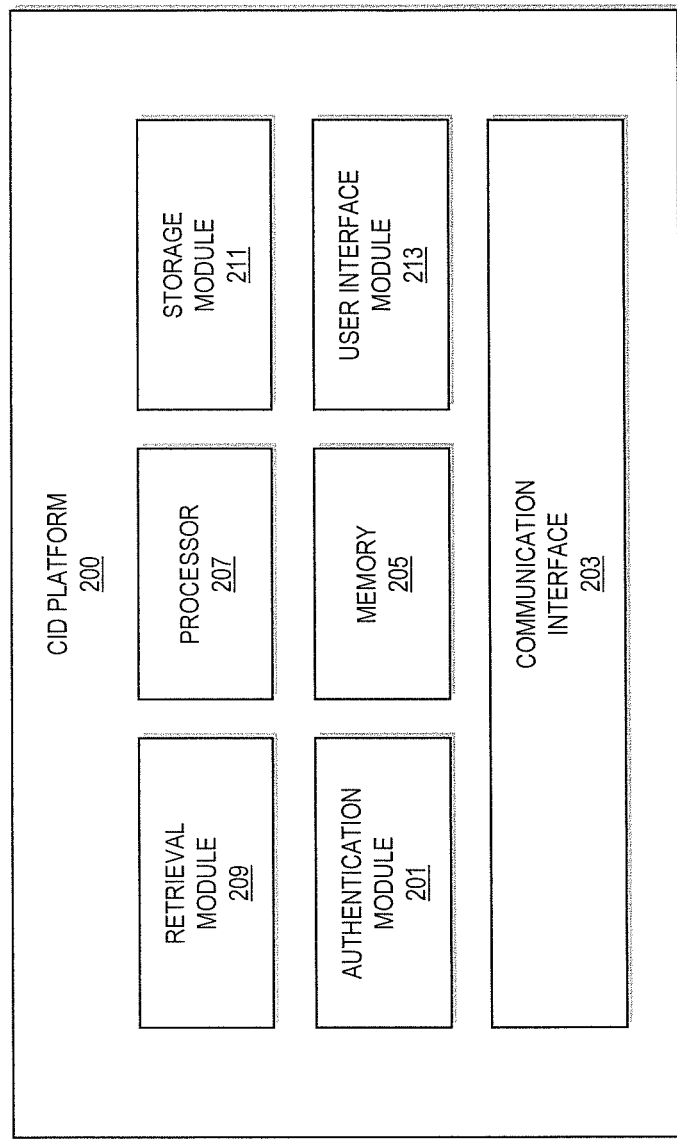
FIG. 2 is a diagram of a caller identification platform, according to an exemplary embodiment.

FIG. 2 is a diagram of a caller identification platform, according to an exemplary embodiment. CID platform 200 may comprise computing hardware (such as described with respect to FIG. 10), as well as include one or more components configured to execute the processes described herein for providing the managed CID services of system 100 to subscribers at communication devices 105-109. In one implementation, CID platform 200 includes authentication module 201, communication interface 203, memory 205, processor 207, retrieval module 209, storage module 211, and user interface module 213. CID platform 200 may communicate with one or more websites or web portals 119 (e.g., networked social sites) and/or one or more repositories, e.g., CID content repositories 121, 123 and CID profiles repository 125. Further, subscribers may access CID platform 200 via communication devices 105-109. It is contemplated; however, that platform 200 may embody many forms and include multiple and/or alternative components. For example, it is contemplated that the components of CID platform may be combined, located in separate structures, or separate locations. Accordingly, CID platform 200 may be configured as, or be distributed between, one or more frontend, middleware, and/or backend servers accessible via one or more of networks 111-117. Namely, a specific topology is not critical to embodiments of CID platform 200 or system 100 for that matter.

In exemplary embodiments, CID platform 200 enables users (or subscribers) to create and configure one or more CID profiles including associations between images, directory addresses, and, in certain instances, other CID-like identifiers. In this manner, CID platform 200 provides a user interface, e.g., a networked portal, to permit user access to the features and functionality of CID platform 200 via communication devices 105-109. According to certain embodiments, user interface module 213 may be configured for exchanging information between client devices 105-109 and a web browser or other networked-based application. In exemplary embodiments, user interface module 213 executes a graphical user interface (GUI) application configured to provide users with one or more menus of options for creating and configuring CID profiles, which may include CID buddy lists, as well as engage with the other features of the managed CID services of system 100. An exemplary GUI is described in more detail in accordance with FIG. 5.

As such, user interface module 213 enables users to "upload" images from a memory or local (or external) repository of client devices 105-109, or specify image locations, such as locations corresponding to a third-party website, networked social site, etc, for retrieving images. In one embodiment, the images are stored or partially cached to non-volatile local storage of the client devices 105-109; in this manner, outgoing calls employing CID can be readily supported. CID platform 200 includes retrieval module 209 for, in conjunction with communication interface 203, retrieving images from specified image locations. For instance, a user may specify a URI of an image located at a networked social site within a GUI provided by user interface module 213. User interface module 213 may port the URI to retrieval module

209 for obtaining the image at the designated location via communication interface 203. In this manner, CID platform also includes storage module 211 for storing uploaded or retrieved images, or uploaded image locations, to CID profiles repository 125 and/or CID content repositories 121, 123. Storage module 211 may, according to particular embodiments, store images in a compressed format or at a lower resolution based on one or more storage requirements. Other embodiments enable storage module 211 to receive image content in a first format and then convert such format into a second format, which can enable images to be made more easily accessible to a more diverse set of system 100 components and/or facilities. A translator (not shown) may be provided for this purpose. As such, images may be suitably stored at CID platform 200 via, for example, memory 205, or at any other suitable location, such as CID repositories 121, 123, CID profiles repository 125, or at communication devices 105-109. Any suitable image format may be utilized and/or converted to, and may include formats, such as graphics interchange format (GIF), joint photographic experts group (JPEG) format, portable network graphics (PNG) format, scalable vector graphics (SVG) format, tagged image file format (TIFF), etc. According to other embodiments, user interface module 213 enables users to "download" images from one or more of CID repositories 121, 123, or CID profiles repository 125, to a suitable memory, such as a memory of communication devices 105-109, or a local (or external) repository of communication devices 105-109. Further embodiments of user interface module 213 enable users to synchronize end terminal 105-109 instances of one or more CID profiles or CID buddy lists with centralized versions of one or more CID profiles or CID buddy lists.

In this manner, users may associate one or more images (or image locations) with one or more directory addresses via a user interface of user interface module 213. According to other embodiments, user interface module 213 may provide client devices 105-109 with one or more application programming interfaces (API) that can be applied to existing browser applications. These APIs may be configured to enable users to interact with existing networked sites or portals 119, e.g., networked social sites, while, at the same time, enabling users to seamlessly associate one or more images or image locations with one or more directory addresses. This API functionality may be provided via an added drop down menu or widget application. Associations may be configured, organized, scheduled, or otherwise managed via a CID buddy list. Particular instances enable users to schedule associations based on one or more dates, times, or events (e.g., Birthdays, Christmas, Hanukah, New Years, etc.). It is also contemplated that the user interface of user interface module 213 enables users to perform the aforementioned functions, but instead of with respect to images, user interface module 213 may be utilized for building additional associations with CID-like identifiers.

Accordingly, user interfaces (e.g., GUIs) of user interface module 213 may be presented in one or more windows of a conventional browser application. According to certain embodiments, the GUI(s) may be generated and presented in one or more windows controlled by computing device 105, mobile voice station 107, and, when feasible, voice station 109. By way of example, mobile voice station 107 may include a managed CID interface that provides soft and/or hard controls for creating and configuring CID profiles and CID buddy lists, as well as interfacing with other functions and features of the managed CID service of system 100. The interface may include one or more "soft keys" or other GUI implementations, such as a keypad, touch pad, etc. As such, mobile voice station 107 may include a processor and memory configured to store and execute instructions for supporting the managed CID service, as well as other communication functions. Hence, the GUI(s) of user interface module 213 (or corresponding client devices 105 and/or 107) may comprise pages of both textual and graphical information, as well as various interactive control widgets, through which users may access and interact with CID platform 200. In turn, users at computing device 105 and/or mobile voice station 105 can be permitted to input commands to user interface module 213 to control or otherwise manipulate the managed CID service of system 100.

According to other exemplary embodiments, CID platform 200 can be configured to retrieve from, for example, a repository (e.g., CID repository 123) maintained by a service provider, such as a CID service provider, an image associated with a directory address for a user in response to initiation of a communication session by the user with another user. In other embodiments, image retrieval may be made from a website or web portal 119, CID content repository 121, CID profiles repository 125, or communication devices 105-109. In this manner, retrieval module 209 may be further configured, in connection with communication interface 203, to retrieve images from the aforementioned locations in response to initiation of the communication session. Retrieval may be based on a user specified image location stored to, for instance, a CID profile, which may include a CID buddy list for scheduling and organizing one or more associations between images, directory addresses, and other CID-like identifiers. CID profile may alternatively (or additionally) include a policy for performing retrieval and/or provisioning functions. The image along with the corresponding directory address and/or other CID-like identifier may be transmitted to the other user during establishment of the communication session. According to one embodiment, the image may be provided in a compressed format or a modified resolution, or may be compressed or modified by, for example, storage module 211 before transmission to a client device, such as mobile voice station 107. It is also contemplated that CID platform 200 can be configured to retrieve from a suitable location (e.g., one or more of websites 119, CID repositories 121, 123, CID profiles repository 125, communication devices 105-109) an image for the other user for presentation to the user during establishment of the communication session. The user may also be presented with other CID information, e.g., a corresponding directory address, or CID-like identifiers, which may be included in the transmission or provided in another transmission to a respective client device (e.g., computing device 105) of the user. It is further contemplated that the functionality of CID platform 200 may be provided by one or more applications executing on one or more of communication devices 105-109.

In order to provide selective access to the features and functionality of the managed CID services of system 100, CID platform 200 may include authentication module 201 for authenticating (or authorizing) users to the service. It is contemplated that authentication module 201 may operate in concert with communication interface 203 and/or user interface module 213. That is, authentication module 201 may verify user provided credential information acquired via communication interface 203 or user interface module 213 against corresponding credential information stored within a CID profile of repository 125. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, IP, media access control (MAC), etc.), or telephone listing (e.g., work, home, cellular, etc.), as well as any other form of uniquely identifiable datum, e.g., biometric code, voice print, etc. Users may provide this information via client devices 105-109, such as by spoken utterances, dual-tone multi-frequency signals (DTMF), packetized transmission, etc. Unobtrusive security may be provided by positively identifying and screening users based on one or more of the aforementioned credentials which may be seamlessly provided when client devices 105-109 communicate with CID platform 200, such as a unique circuit-ID, PVC-ID, VLAN-ID, IP address, MAC address, etc. Other unobtrusive measures can be made available via user specific voice prints, etc.

Additionally, CID platform 200 may include one or more processors (or controllers) 207 for effectuating the aforementioned managed CID services via authentication module 201, communication interface 203, memory 205, retrieval module 209, storage module 211, and user interface module 213.

Figure 3:
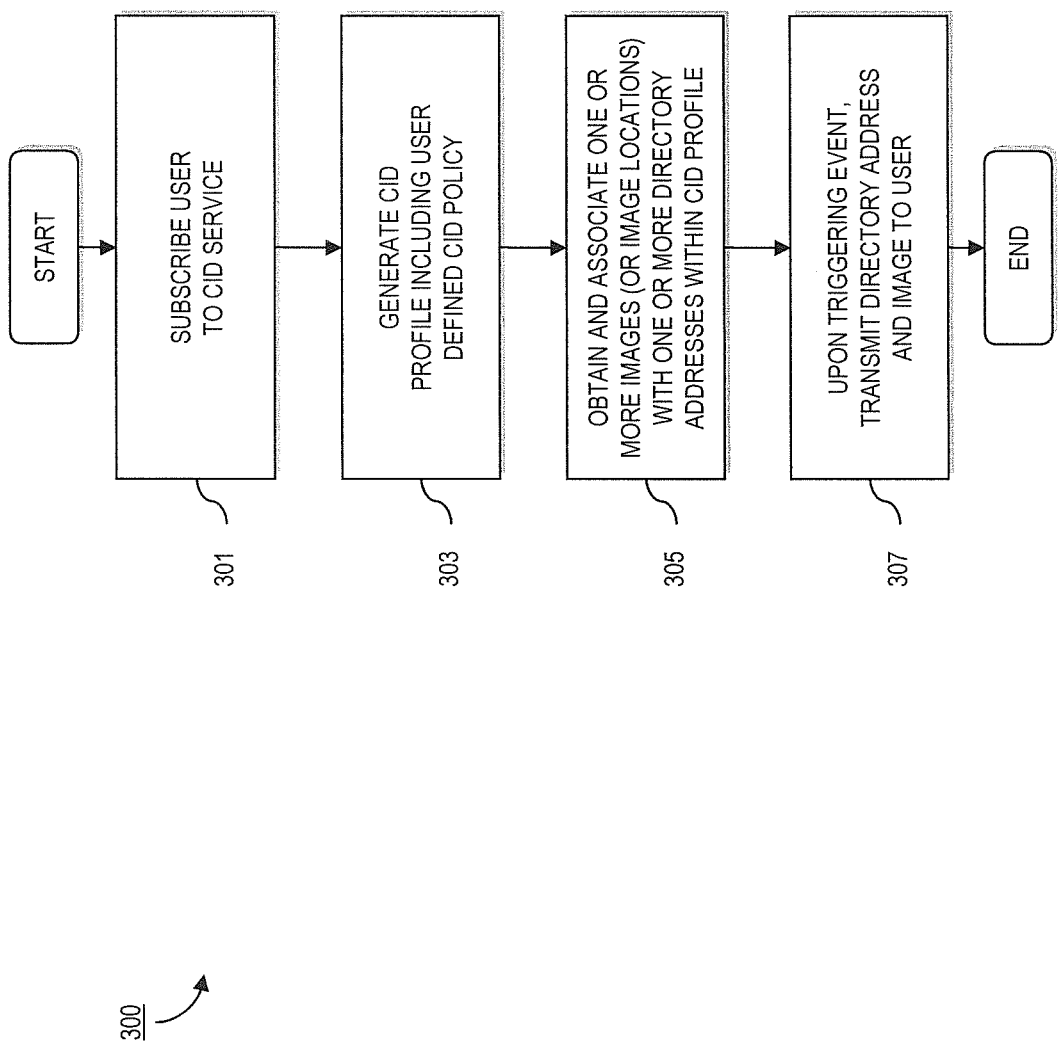
FIG. 3 is a flowchart of a process for providing managed caller identification services, according to an exemplary embodiment.

FIG. 3 is a flowchart of a process for providing managed caller identification services, according to an exemplary embodiment. For illustrative purposes, process 300 is described with reference to FIGS. 1 and 2. It is also noted that the steps of process 300 may be performed in any suitable order, as well as combined or separated in any suitable manner. At step 301, CID platform 200 subscribes a new user to the managed CID service of system 100. According to one embodiment, the user may subscribe utilizing a client device capable of processing and transmitting information over one or more of networks 111-117, such as computing device 105, mobile voice station 107, or telephony device 109. Namely, the user may interact with an input interface of, for example, computing device 105 to activate software resident on the device, such as a GUI or other networked application implemented via CID platform 200. The software may then enable sufficient connections to CID platform 200. As such, the user may register as a new subscriber of the managed CID service, as well as obtain sufficient authentication information for establishing future sessions. In certain embodiments, registration procedures may prompt the user to identify all client devices (e.g., computing device 105, mobile voice station 107, and/or voice station 109) that the user may employ to interact with system 100, e.g., creating and configuring one or more CID profiles, CID buddy lists, uploading/downloading or specifying images, or receiving CID information, images, and/or CID-like identifiers. In this manner, registered devices (such as client device 105-109) may be logically associated with the user, as well as associated with corresponding directory addresses for originating and terminating communication sessions.

Once registered, CID platform 200 enables the user, per step 303, to generate a CID profile including, for instance, a user defined CID policy for extending the managed CID service to the user, as well as other users (or individuals) the user may attempt to contact via a communication session. The CID profile may include the aforementioned standardized user profile information, e.g., username, password, account information, billing information, configuration information, and the like, as well as particular CID configuration information, identifiers, images, image locations, etc. As previously mentioned, a more detailed description of a CID profile will be provided in conjunction with FIG. 6A. It is noted; however, that CID profiles can include at least one image (or image location) associated with a corresponding directory address. As such, CID platform 200 may obtain and associate the image (or image location) with one or more directory addresses within the configured CID profile, per step 305. A CID buddy list may be utilized for organizing, scheduling, or otherwise managing these associations, as well as additional associations with CID-like identifiers or other CID information. Again, as previously noted, a more detailed description of a CID buddy list will be provided in connection with FIG. 6B.

After generating a CID profile, CID platform 200 may store the user to a list of subscribers to the managed CID service, as well as a list of subscriber device (e.g., client devices 105-109) identifiers, authentication information, and user-defined CID profiles to CID profiles repository 125 or other suitable memory, such as memory 205. Additionally (or alternatively), users may directly interact with CID profile repository 125. Images, image locations, CID-like identifiers, etc., may be retrieved from, for example, one or more websites or web portals 119, CID content repository 121, or communication devices 105-109, and stored to CID content repository 123, which can be maintained by a service provider. Further, CID profiles, identifiers, images, image locations, and/or configuration data may be stored within respective client devices (e.g., client devices 105-109). For example, and assuming a client device (such as mobile voice station 107) includes (or has access to) suitable storage capacity, CID profiles, identifiers, images, image locations, and/or configuration data may be associated with one or more directory addresses and stored at the client device. Further, if a client device (e.g., client devices 105-109) has limited storage capacity, portions of the aforementioned content, information, or data may be cached to a memory (e.g., volatile random access memory, etc.) or local (or external) storage device (e.g., embedded or removable storage like, for example, a non-volatile read only memory, non-volatile flash memory card or drive, etc.) of the client device. Thus, CID platform 200, per step 307, can transmit a directory address, image, and/or any other CID information or CID-like identifier to the user (e.g., calling party) and/or another user (e.g., a called party) upon a triggering event, e.g., initiation of a communication session by the user with the other user. In those instances when CID profiles, identifiers, images, image locations, and/or configuration data is stored or accessible to client devices 105-109, client devices 105-109 need not receive all (or portions) of the aforementioned content, information, or data from CID platform 100, such as when a communication session is initiated or received. It is also contemplated that CID platform 200 can signal respective client devices 105-109 to perform its tasks, such as, for example, when the directory address, image, and/or other CID information or CID-like identifiers are locally stored at, or accessible to, client devices 105-109.

Figure 4:
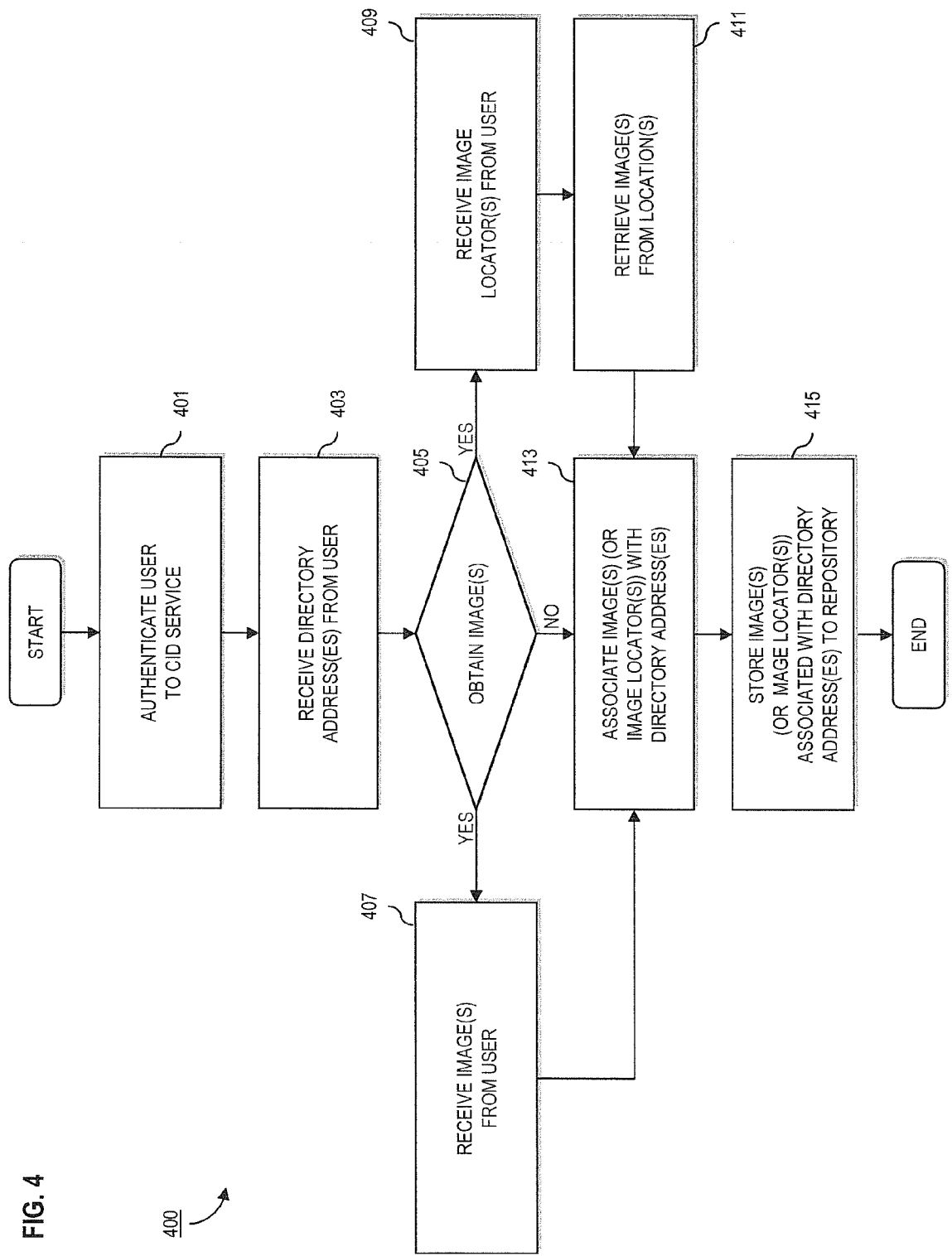
FIG. 4 is a flowchart of a process for obtaining and associating images with directory addresses, according to an exemplary embodiment.

FIG. 4 is a flowchart of a process for obtaining and associating images with directory addresses, according to an exemplary embodiment. It is noted that process 400 assumes a user via, for example, a client device (e.g., computing device 105, mobile voice station 107, or voice station 109) is attempting to build a CID profile via CID platform 200. In this regard, the user may associate one or more images with one or more directory addresses in the process. Thus, for illustrative purposes, process 400 is described with reference to FIGS. 1 and 2. It is also noted that the steps of process 400 may be performed in any suitable order, as well as combined or separated in any suitable manner. In step 401, authentication module 201 authenticates the user to the managed CID service of system 100 via, for instance, user input to a GUI of user interface module 213. It is noted, however, that authentication may be implicitly performed. For example, authentication may be assumed when a user navigates from one service or feature of CID platform 200 to another, when a user accesses a service or feature of CID platform 200 via a previously authenticated device (e.g., client device 105-109) or connection. Once authenticated, the GUT will enable the user to build and configure a CID profile such that, during step 403, user interface module 213 may receive one or more directory addresses from the user, which may correspond to potential communication session contacts. It is noted that the directory addresses may correspond to buddy names, electronic mail addresses, IP addresses, phone numbers, etc.

Accordingly, the user may wish to associate the directory addresses with one or more images or image locations for presentation via, for example, CID display 103 so that potential communication session contacts may identify the user as an initiator of a communication session. In other embodiments, CID display 103 may be utilized by the user to confirm that they are, in fact, attempting to initiate a communication session with an intended communication session contact. Thus, per step 405, user interface module 213 provides the user with one or more options for providing images or image locations and, thus, user interface module 213 must determine whether to obtain an image based on one or more user inputs to user interface module 213. If the user decides to upload an image, then user interface module 213, via communication interface 203 and/or retrieval module 209, may receive the image from the user, in step 407. If the user decides to specify an image location, then user interface module 213 may receive an image locator from the user, during step 409. In step 411, user interface module 213 may port the image locator to retrieval module 209 to retrieve the image at the specified location, e.g., a networked social site, via communication interface 203. According to other embodiments, CID platform 200 may just accept an image locator and not obtain the image until another point in time. This may be the case when CID platform 200 signals client devices 105-109 to perform the tasks of retrieving a directory address, an image, and/or other CID information or CID-like identifiers from a local memory or from a remote location, e.g., CID repository 121, 123, website 119, etc. It is noted that the user may employ any one or more of these approaches for obtaining or specifying images.

In any event, processor 207 may be configured to associate the one or more retrieved images or specified image locator(s) with the one or more directory addresses, at step 413. As such, processor 207 may also utilize storage module 211 to store the images, or image locators, associated with the directory addresses to a suitable memory (e.g., memory 205) or repository (e.g., CID repository 123), during step 415. Storage module 211 may, according to particular embodiments, store images in a compressed format (or lower resolution) based on one or more storage requirements. In other embodiments, storage module 211 may receive image content in a first format and then convert such format into a second format based on one or more storage requirements. While process 400 was described with respect to obtaining and associating images with directory addresses, process 400 is equally applicable to obtaining and building associations with other CID information or CID-like identifiers. It is also contemplated that the functions and features of CID platform 200 may be assumed by client devices 105-109 and, therefore, process 400 is equally applicable to obtaining and building associations via one or more applications and/or components executed on or by client devices 105-109.

Figure 5:
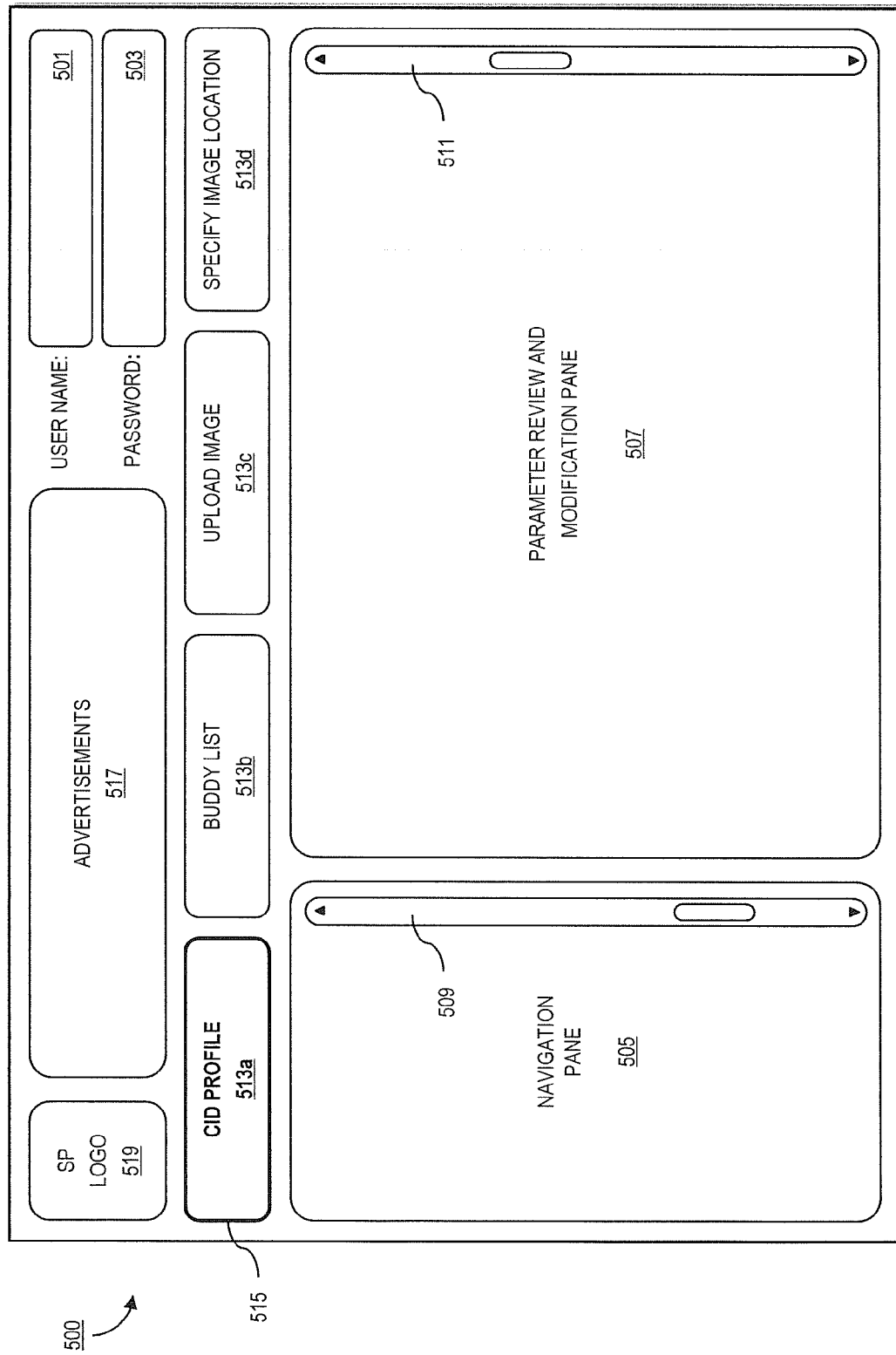
FIG. 5 is a diagram of a user interface utilized in the processes of FIGS. 3 and 4, according to an exemplary embodiment.

FIG. 5 is a diagram of a user interface utilized in the processes of FIGS. 3 and 4, according to an exemplary embodiment. As shown, an exemplary user interface 500 is provided, wherein authenticated users may create, configure, modify, and review one or more CID profiles and CID buddy lists, as well as upload images or specify image locations. User interface 500 may be invoked using a number of different methods. For example, a user may navigate to a webpage providing access to CID platform 200 through user interface 500. Further, user interface 500 may be evoked by selecting an option within another interface or application (e.g., when navigating from a public screen to a user-specific screen, i.e., a private screen). As such, an executing device (e.g., client devices 105-109) may require sufficient authentication information (e.g., username, password, etc.) to be input in order to access the functions of user interface 500. Accordingly, user interface 500 includes input fields 501 and 503 for a username and password, respectively. In alternative embodiments, input fields 501 and 503 may be configured to correspond to associated authentication information, such as entering a MAC address and password, etc. As previously mentioned, authentication may be implicit and, therefore, input fields 501 and 503 may be pre-populated or provided as, for example, a "welcome" field (not shown), e.g., "WELCOME USERNAME," wherein "USERNAME" can be made to dynamically correspond to the implicitly authenticated user.

In the illustrated embodiment, user interface 500 may include one or more interactive panes, such as panes 505 and 507. In particular embodiments, as will be described in more detail below, the content of pane 507 may be dynamically updated to display various information related to actions conducted within pane 505, and vice versa. Pane 505 (i.e., a navigation pane) includes a listing of selectable entries corresponding to one or more configurable parameters (or options) that may be associated with a subscription service, such as those parameters previously mentioned. In other embodiments, pane 505 may include a navigation tree, an expandable table of contents, or FlashMedia presentation of selectable entries. Based on a particular selection within pane 505, pane 507 (i.e., a parameter review and modification pane) may be populated with appropriate input fields, selectable elements (e.g., toggle buttons, check boxes, radio buttons, sliders, list boxes, spinners, drop-down lists, menus, toolbars, ribbons, combo boxes, icons, etc.), output fields (e.g., labels, tooltips, balloon helps status bars, progress bars, infobars, etc.) and windows, as well as any other suitable interface widget for inputting (or otherwise perceiving) configurable parameters. In turn, actions within pane 507 may affect selectable parameters within pane 505.

Navigational elements/fields, e.g., scrollbars 509 and 511, as well as tabs 513a-513d, may be provided and configured to indicate the existence of additional entries not displayed, but navigably available, as well as facilitate interface usability. Accordingly, users may browse to these entries via, for instance, an input interface of a client device 105-109, such as a cursor control. One or more fixed focus states (e.g., border 515) and/or distinctive magnification features, e.g., color, brightness, bolding, font type, text size, etc., may be used to convey a "currently" navigated position or parameter to be entered. In certain embodiments, a plurality of graphical elements may be provided to correspond to the one or more options and/or configurations of the subscription service to aid usability, and thus may be displayed therewith.

In this manner, when a user navigates to a desired entry, actuation of, for instance, a "CID PROFILE" tab 513a or a "BUDDY LIST" tab 513b may launch corresponding subscription service options and configuration fields within panes 505 and 507. In other embodiments, aural descriptions or effects may be provided when a user navigates, for instance, a cursor over particular fields of panes 505 and 507.

An "UPLOAD IMAGE" tab 513c may be provided for users to upload images to CID platform 200 or other suitable repository, e.g., CID content repository 123. A "SPECIFY IMAGE LOCATION" tab 513d may be provided for users to specify, for instance, one or more XRIs, IP addresses, URIs, HTTP addresses, etc., for obtaining images. While not shown, a "DOWNLOAD IMAGE" tab may be provided for downloading images from CID platform 200 or other suitable location, e.g., CID content repository 121, 123, or websites or web portals 119. Other tabs may be provided for uploading, specifying, organizing, and scheduling other CID information and/or CID-like identifiers. Additionally, interface 500 may be configured to accept verbal commands for entering suitable data into entry fields within pane 507 or making selections within pane 505. In other embodiments, interface 500 may include fields for targeted advertisements 517, fields for service provider logos 519, and any other suitable field for extending the managed CID service to subscribers.

Accordingly, tabs 513a and 513b enable users to create, configure, modify, and review one or more CID profiles and CID buddy lists. FIGS. 6A and 6B are respective diagrams of a CID profile and a CID buddy list, according to exemplary embodiments. As seen in FIG. 6A, exemplary CID profile 600 provides an association table for provisioning CID information, images, and/or CID-like identifiers to individuals contacted via a communication session initiated by user "JOHN SMITH." It is contemplated, however, that CID profile 600 may be utilized to organize CID profiles of more than one user. In exemplary embodiments, CID profile 600 includes fields for user name 601, directory address 603, schedule 605, CID image or image locator 607, image preview 609, CID text 611, ringtone 613, and ringback 615. Other fields may be provided for other CID content, such as media or multimedia CID presentations, e.g., CID video clips. For example, user "JOHN SMITH" may build CID profile 600 to include an association between directory address "(555) 444-3333" and image locator "WWW.ADDRESS_1.COM." As such, the association may be scheduled for Mondays through Fridays during the hours of 5:01 PM to 8:59 AM. An image preview may be provided in a corresponding image preview field. The association may further include associations with other CID information, such as CID text (i.e., "MESSAGE 2"), and CID-like identifiers, such as a ringtone (i.e., "RINGTONE '2'"), and a ringback (i.e. "RINGBACK '2'"). It is noted that association scheduling may be based on one or more dates, times, and/or events (e.g., Birthdays, Christmas, Hanukah, New Years, etc.).

Referring to FIG. 6B, an exemplary CID buddy list 650 is provided. CID buddy list 650 provides an association table for provisioning CID information, images, and/or CID-like identifiers to the user when another user (or buddy) attempts to contact the user via a communication session, as well as for provisioning CID information, images, and/or CID-like identifiers to the user when the user attempts to contact another user via a communication session. In particular embodiments, conflicts between CID profiles and CID buddy lists may be resolved through "override" allowances. Namely, users may predetermine whether to utilize the CID information, images, and/or CID-like identifiers within their own CID profile or CID buddy list, or to allow another user's CID profile or CID buddy list to override their CID profile or CID buddy list. As shown, CID buddy list 650 includes fields for buddy name 651, corresponding directory address 653, scheduling information 655, CID image or image locator 657, image preview 659, CID text 661, ringtone 663, and ringback 665. Other fields may be provided for other CID content, such as media or multimedia CID presentations, e.g., CID video clips. For example, user "JOHN DOE" may create and configure CID buddy list 650 to include an association for buddy "JANE DOE." As such, the association may be established between directory address "(123) 456-7980" and image "IMAGE_M.PNG." As such, the association may be scheduled for the first of each year, which may correspond to Jane's birthday. An image preview may be provided in a corresponding image preview field. The association may further include associations with other CID information, such as CID text (i.e., "WISH JANE A HAPPY BIRTHDAY"), and CID-like identifiers, such as a ringtone (i.e., "BIRTHDAY RINGTONE"), and a ringback (i.e. "BIRTHDAY RINGBACK").

According to particular embodiments, CID profile 600 and/or CID buddy list 650 may be keyed according to user name, buddy name, directory address, or other suitable key value. It is also contemplated that CID profile 600 and CID buddy list 650 may be combined into one association table, or may be provided in any other suitable form, model, or structure for collecting, organizing, and maintaining the CID information, images, and/or CID-like identifiers. As such, user interface 500 may be utilized to populate the various fields within CID profile 600 and CID buddy list 650.

FIG. 7 is a flowchart of a process for delivery of managed caller identifications, according to an exemplary embodiment. For illustrative purposes, process 700 is described with reference to FIGS. 1 and 2. It is also noted that the steps of process 700 may be performed in any suitable order, as well as combined or separated in any suitable manner. In step 701, CID platform 200 receives, via communication interface 203, an indication that a client device (e.g., computing device 105) of a user is initiating a communication session (e.g., telephone call) with a client device (e.g., mobile voice station 107) of another user. According to one embodiment, the indication can include information corresponding to a first directory address, i.e., the directory address dialed by the user to contact the other user, as well as a second directory address, i.e., a directory address of the user. Per step 703, processor 207 causes retrieval module 209 to retrieve a first image associated with the first directory address from a storage location, such as CID content repository 123. In exemplary embodiments, the first image corresponds to the other user and will be provided to the user so that the user can confirm that they are, in fact, attempting to contact an intended party, i.e., the other user. During step 705, processor 207 causes retrieval module 209 to retrieve a second image associated with the second directory address from a storage location, such as website or web portal 119. According one embodiment, the second image corresponds to the user and will be provided to the other user so that the other user may identify the initiating party of the communication session, i.e., the user. It is noted that steps 703 and 705 may be performed based on one or more policies within one or more CID profiles and/or CID buddy lists, such as CID profile 600 and CID buddy list 650, which may be stored to CID profiles repository 125 or other suitable location, such as memory 205. Further, the first image and the second image may be retrieved in a compressed (or lower resolution) state (or format).

Once the images are retrieved, processor 207 causes communication interface 203 to transmit the first image associated with the first directory address, along with the first directory address, to the user at computing device 105 during establishment of the communication, per step 707. Likewise, processor 207 causes communication interface 203 to transmit the second image associated with the second directory address, along with the second directory address, to the other user at mobile voice station 107 during establishment of the communication, at step 709. In certain embodiments, steps 703-709 may also include retrieval and transmission of other CTD information and/or other CID-like identifiers. According to particular embodiments, storage module 211 may be utilized to compress (or decrease the resolution of) images before transmission to client devices 105 and/or 107.

Figure 8B:
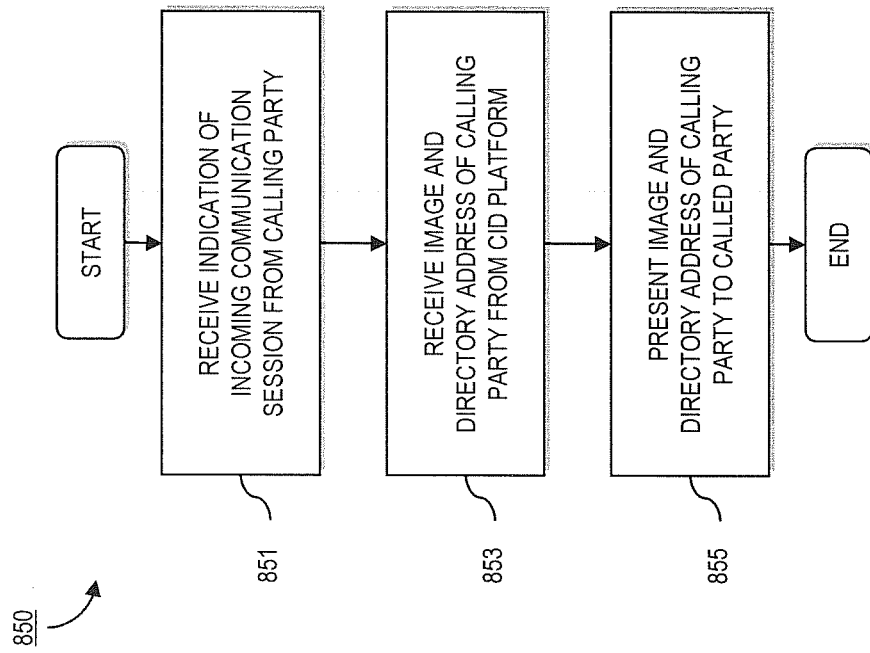
FIGS. 8A and 8B are respective flowcharts of processes for presenting managed caller identifications to a calling party and a called party, according to exemplary embodiments.
Figure 8A:
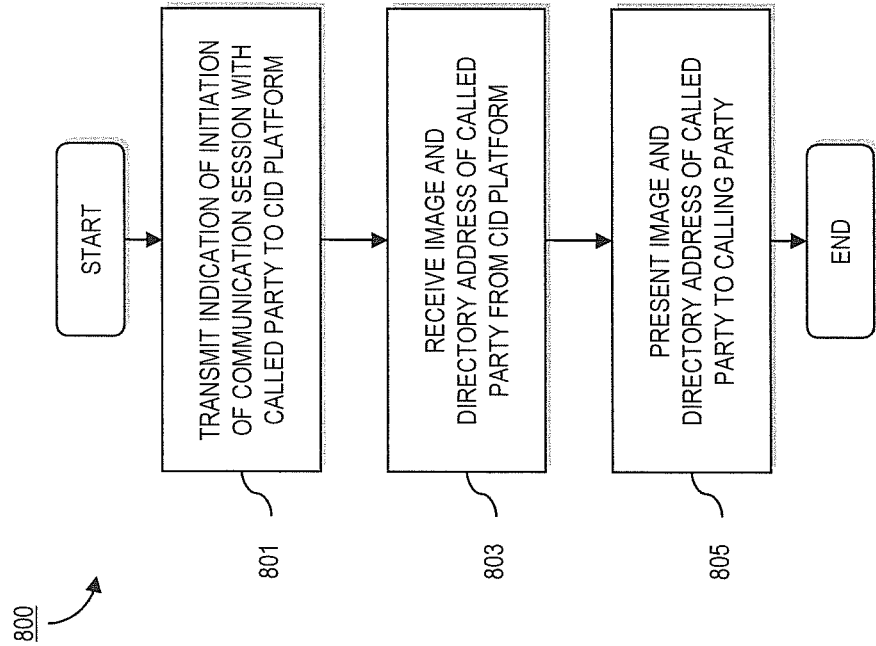

Accordingly, the transmission(s) of process 700 may be received by one or more client devices (e.g., computing device 105 and mobile voice station 107) and presented to users via, for example, CID display 103. FIGS. 8A and 8B are respective flowcharts of processes for presenting managed caller identifications to a calling party and a called party, according to exemplary embodiments. For illustrative purposes, processes 800 and 850 are described with reference to FIGS. 1 and 2. It is also noted that the steps of processes 800 and 850 may be performed in any suitable order, as well as combined or separated in any suitable manner.

Process 800 corresponds to provisioning the managed CID service of system 100 to a calling party at a client device (e.g., mobile voice station 107), according to an exemplary embodiment. It is assumed that the calling party dials the directory address (e.g., telephone number) of the called party via mobile station 107. Thus, in step 801, mobile voice station 107 transmits an indication to CID platform 200 indicating the initiation of a communication session with a called party at, for example, voice station 109. During step 803, mobile voice station 107 receives an image and directory address of the called party from CID platform 200 and, in certain embodiments, other CID information or CID-like identifiers may also be included. Per step 805, mobile voice station 107 presents the image and the directory address of the called party to the calling party via, for example, CID display 103. The other CID information and/or CID-lice identifiers may also be presented, which may include presentation via a display of mobile station 107 and/or an audio interface of mobile station 107. Accordingly, the calling party may utilize the presentation(s) to confirm whether they are, in fact, attempting to initiate a communication session with an intended called party.

Process 850 corresponds to provisioning the managed CID service of system 100 to a called party at a client device (e.g., voice station 109), according to an exemplary embodiment. It is assumed that a calling party dials the directory address (e.g., telephone number) of the called party. As such, in step 851, voice station 109 receives an indication of an incoming communication session from the calling party. During step 853, voice station 109 receives an image and directory address of the calling party from CID platform 200 and, in certain embodiments, other CID information or CID-like identifiers may also be included. Per step 855, voice station 109 presents the image and the directory address of the calling party to the called party via, for example, a suitable display and/or audio interface. The other CID information and/or CID-like identifiers may also be presented. Accordingly, the called party may utilize the presentation(s) to identify the calling party initiating the communication session.

Figure 9B:
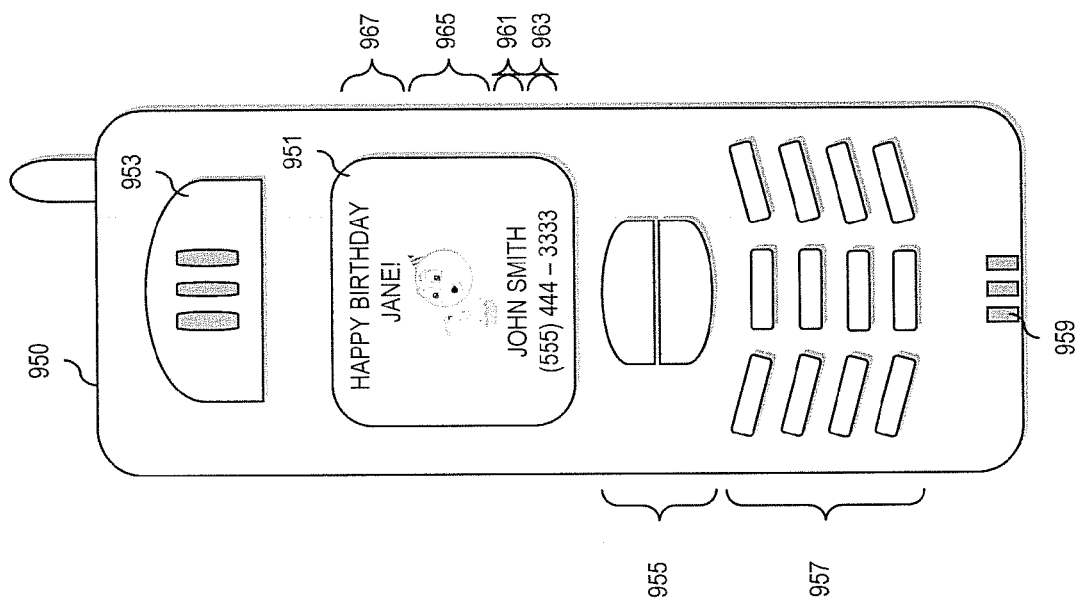
FIGS. 9A and 9B are respective diagrams of mobile voice stations of a calling party and a called party capable of presenting managed caller identifications, according to exemplary embodiments.
Figure 9A:
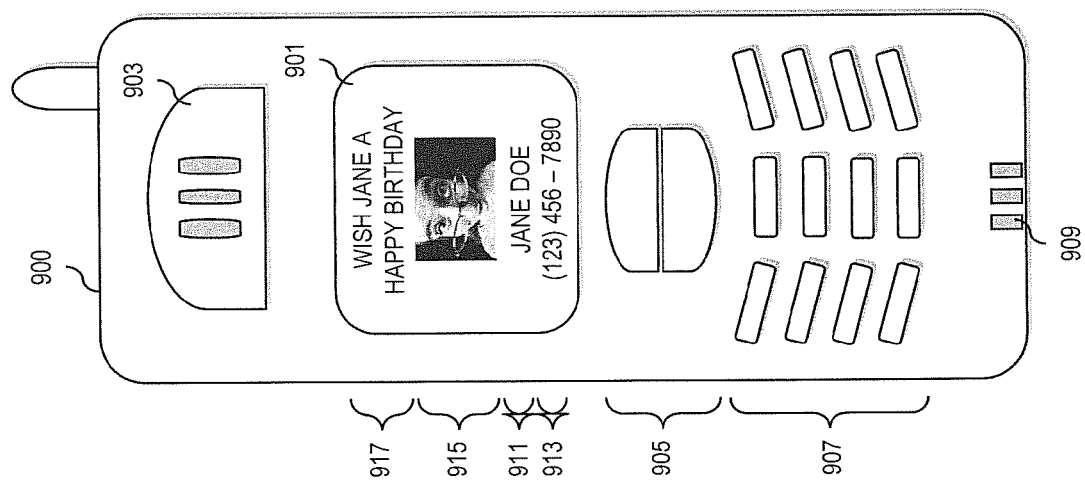

FIGS. 9A and 9B are respective diagrams of mobile voice stations of a calling party and a called party capable of presenting managed caller identifications, according to exemplary embodiments. By way of example, mobile voice stations 107 of FIG. 1 may be implemented as mobile phones 900 and 950, which include displays 901 and 951 that are configured to present managed CIDs. Any auditory content of the managed CID presentations may be output via suitable transducers (e.g., speaker) 903 and 953. Mobile phones 900 and 950 may also include cursor buttons 905 and 955 and key pads 907 and 957 for initiating or accepting communication sessions. Further, microphones 909 and 959 may be provided for receiving voice commands and/or facilitating voice communications.

In this manner, display 901 may correspond to the display of a calling party, while display 951 may correspond to the display of a called party. Display 901 includes name field 911, directory address field 913, and image field 915 for presenting a corresponding name, directory address, and image of the party that the calling party is attempting to contact. Similarly, display 951 includes name field 961, directory address field 963, and image field 965 for presenting a corresponding name, directory address, and image of the party attempting to contact the called party. According to particular embodiments, displays 901 and 951 respectively include corresponding CID text regions 917 and 967. These regions may be provided to convey information, such as CID information or other information. As shown, text region 917 reminds the calling party to "WISH JANE A HAPPY BIRTHDAY," while text region 967 is utilized to wish Jane a happy birthday, i.e., "HAPPY BIRTHDAY JANE." It is contemplated that other media or multimedia CID presentations may be provided by mobile phones 900 and 950 via displays 901 and 953, as well as transducers 903 and 953.

The processes described herein for providing caller identification services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
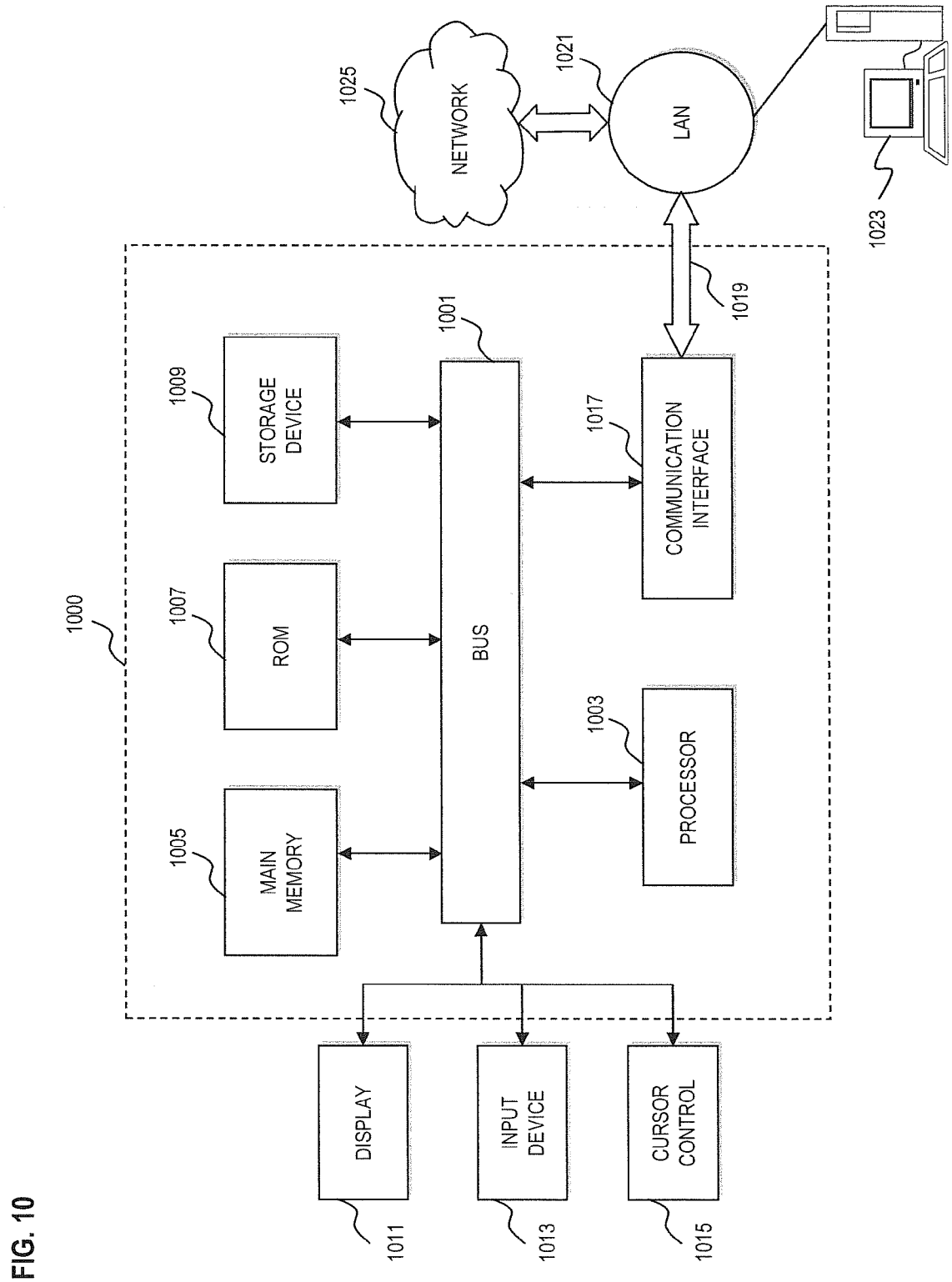
FIG. 10 is a diagram of a computer system that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
retrieving, from a repository maintained by a service provider, an image associated with a directory address for a user in response to initiation of a communication session by the user with another party; and
transmitting the image along with the directory address for presentation to the other party during establishment of the communication session,
wherein the repository includes a user caller identification (CID) profile for the user,
wherein the CID profile of the user includes identification information of one or more other parties to be called by the user, a time schedule, ringtone information and ringback information for the one or more other parties corresponding to certain time periods of the time schedule, and image information for the one or more other parties corresponding to the certain time periods of the time schedule for presentation of an image of the other party to the user during establishment a respective communication session in the certain time periods of the time schedule, and
wherein different ringtones and ringbacks, and different images corresponding to the one or more other users are provided during establishment of the respective communication session during different time periods of the time schedule.

2. A method according to claim 1, wherein the communication session is a voice call that is established over a circuit-switched network or a packet-switched network.

3. A method according to claim 1, wherein the communication session is initiated from a telephony capable device including a wireless phone or an Internet Protocol (IP) phone.

4. A method according to claim 1, further comprising:
modifying resolution of the image based on storage requirement.

5. A method according to claim 1, wherein the image is retrieved from a website based on the CID profile of the user, the CID profile of the user including a uniform resource identifier of the image.

6. A method according to claim 5, wherein the uniform resource identifier is associated with the directory address by the user via a web-based portal.

7. A method according to claim 1, wherein the image has been stored to the repository by the user via a web-based portal.

8. A method according to claim 1, wherein a buddy list associates the image with the directory address.

9. A method according to claim 1, wherein the image is stored or partially cached to non-volatile local storage in a user device.

10. An apparatus comprising:
a processor configured to retrieve, from a repository maintained by a service provider, an image associated with a directory address for a user in response to initiation of a communication session by the user with another party; and
a communication interface configured to transmit the image along with the directory address for presentation to the other party during establishment of the communication session,
wherein the repository includes a user caller identification (CID) profile for the user, and
wherein the CID profile of the user includes identification information of one or more other parties to be called by the user, a time schedule, ringtone information and ringback information for the one or more other parties corresponding to certain time periods of the time schedule, and image information for the one or more other parties corresponding to the certain time periods of the time schedule for presentation of an image of the other party to the user during establishment of a respective communication session in the certain time periods of the time schedule, and
wherein different ringtones and ringbacks, and different images corresponding to the one or more other users are provided during establishment of the respective communication session during different time periods of the time schedule.

11. An apparatus according to claim 10, wherein the communication session is a voice call that is established over a circuit-switched network or a packet-switched network.

12. An apparatus according to claim 10, wherein the communication session is initiated from a telephony capable device including a wireless phone or an Internet Protocol (IP) phone.

13. An apparatus according to claim 10, wherein the processor is further configured to modify resolution of the image based on storage requirement.

14. An apparatus according to claim 10, wherein the image is retrieved from a website based on the CID profile of the user, the image information relating to a uniform resource identifier of the image.

15. An apparatus according to claim 14, wherein the uniform resource identifier is associated with the directory address by the user via a web-based portal.

16. An apparatus according to claim 10, wherein the image has been stored to the repository by the user via a web-based portal.

17. An apparatus according to claim 10, wherein a buddy list associates the image with the directory address.

18. An apparatus according to claim 10, wherein the image is stored or partially cached to non-volatile local storage in a user device.

19. A system comprising:
a portal configured to enable a caller to associate an image with a directory address for the caller as part of a managed caller identification service, the portal being further configured to enable the caller to associate an image with a directory address for a called party as part of the managed caller identification service,
wherein the portal is further configured to include a user caller identification (CID) profile for the caller, and
wherein the CID profile of the caller includes an image of the caller, identification information of one or more parties to be called by the caller, a time schedule, ringtone information and ringback information for the one or more parties to be called corresponding to certain time periods of the time schedule, and image information for the one or more parties to be called in the certain time periods of the time schedule,
wherein the image for the called party along with the directory address is presented to the caller via the image information, and the image for the caller along with the directory address is presented to the called party during establishment of a call, and
wherein different ringtones and ringbacks, and different images corresponding to the one or more parties to be called are provided during establishment of a respective communication session during different time periods of the time schedule.

20. A system according to claim 19, wherein the image is stored or partially cached to non-volatile memory of a user device associated with the called party or a calling party, wherein the user device is configured to retrieved the image from the memory for presentation to the called party or the calling party.

21. A system according to claim 19, further comprising:
a server configured to receive the image from the caller, and to adjust resolution of the image for either storage or presentation.

22. A system according to claim 19, wherein the call includes packetized voice packets.

23. A system according to claim 19, wherein the portal interfaces with a social network site to obtain the image of the caller.

* * * * *